United States Patent
Bontu et al.

(10) Patent No.: US 7,522,841 B2
(45) Date of Patent: Apr. 21, 2009

(54) EFFICIENT DATA TRANSMISSION AND TRAINING OF DATA PROCESSING FUNCTIONS

(75) Inventors: Chandra Bontu, Nepean (CA); Kuang Tsan Wu, Kanata (CA); John McNicol, Ottawa (CA); Kim B. Roberts, Nepean (CA); Han Sun, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 501 days.

(21) Appl. No.: 11/328,199

(22) Filed: Jan. 10, 2006

(65) Prior Publication Data

US 2007/0092260 A1    Apr. 26, 2007

Related U.S. Application Data

(60) Provisional application No. 60/728,751, filed on Oct. 21, 2005.

(51) Int. Cl.
*H04B 10/00* (2006.01)

(52) U.S. Cl. .................. 398/154; 398/152; 398/155
(58) Field of Classification Search ............... 398/185, 398/152, 154, 155
See application file for complete search history.

(56) References Cited

U.S. PATENT DOCUMENTS

| | | | | |
|---|---|---|---|---|
| 4,054,753 A | * | 10/1977 | Kaul et al. | 370/324 |
| 4,506,388 A | | 3/1985 | Monerie et al. | |
| 4,720,827 A | | 1/1988 | Kanaji | |
| 4,723,316 A | | 2/1988 | Glance | |
| 4,965,858 A | | 10/1990 | Naito et al. | |
| 5,457,563 A | | 10/1995 | Van Deventer | |
| 5,473,463 A | | 12/1995 | Van Deventer | |
| 5,555,017 A | * | 9/1996 | Landante et al. | 348/14.09 |
| 5,838,470 A | * | 11/1998 | Radehaus et al. | 398/79 |
| 5,995,512 A | | 11/1999 | Pogue, Jr. | |

(Continued)

FOREIGN PATENT DOCUMENTS

EP    1453239    1/2004

(Continued)

OTHER PUBLICATIONS

PLL-Free Synchronous QPSK Polarization Multiplex/Diversity Receiver Concept with Digital I & Q Baseband Processing, IEEE Photonics Technology Letters, vol. 17, No. 4, Apr. 2005, pp. 887-889. R. Noé.

(Continued)

*Primary Examiner*—Ken N Vanderpuye
*Assistant Examiner*—Danny W Leung
(74) *Attorney, Agent, or Firm*—Kent Daniels; Blake, Cassels & Graydon LLP (57) ABSTRACT

A method of a conveying data through an optical communications system. An optical signal is received through the optical communication system, the optical signal comprising data symbols and SYNC bursts, each SYNC burst having a predetermined symbol sequence. The received optical signal is oversampled to generate a multi-bit sample stream. The sample stream is partitioned into blocks of contiguous samples, wherein each block of samples partially overlaps at least one other block of samples and encompasses at least one SYNC burst and a plurality of data symbols. Each block of samples is independently processed to detect a value of each data symbol.

45 Claims, 7 Drawing Sheets

U.S. PATENT DOCUMENTS

| | | | |
|---|---|---|---|
| 6,437,892 B1* | 8/2002 | Fang et al. .................. | 398/152 |
| 6,473,222 B2 | 10/2002 | Hait et al. | |
| 6,607,311 B1 | 8/2003 | Fishman et al. | |
| 6,782,211 B1 | 8/2004 | Core | |
| 7,076,168 B1* | 7/2006 | Shattil ........................ | 398/76 |
| 2002/0012152 A1 | 1/2002 | Agazzi et al. | |
| 2002/0186435 A1 | 12/2002 | Shpantzer et al. | |
| 2003/0063285 A1 | 4/2003 | Pering et al. | |
| 2003/0123884 A1 | 7/2003 | Willner et al. | |
| 2003/0175034 A1 | 9/2003 | Noe | |
| 2004/0114939 A1 | 6/2004 | Taylor | |
| 2005/0196176 A1 | 9/2005 | Sun et al. | |
| 2006/0066593 A1* | 3/2006 | Anderson et al. ........... | 345/204 |
| 2006/0285854 A1* | 12/2006 | Sun et al. .................... | 398/155 |
| 2006/0285855 A1* | 12/2006 | Sun et al. .................... | 398/155 |
| 2007/0092259 A1* | 4/2007 | Bontu et al. ................. | 398/147 |

FOREIGN PATENT DOCUMENTS

| | | |
|---|---|---|
| GB | 2214381 A | 8/1989 |
| WO | WO 00/60776 A1 | 10/2000 |
| WO | WO 02/27994 A1 | 4/2002 |

OTHER PUBLICATIONS

Phase Noise-Tolerant Synchronous QPSK/BPSK Baseband-Type Intradyne Receiver Concept with Feedforward Carrier Recovery, Journal of Lightwave Technology, vol. 23, No. 2, Feb. 2005, pp. 802-808, Reinhold Noé.

International Search Report for applicant's corresponding International PCT Application PCT/CA2006/001458, Dec. 15, 2006, pp. 1-3.

Isaac Shpantzer, Ph.D., "A New Generation of Coherent ULH Fiber-Optic Communication", CeLight Inc., 40 G Workshop, OECC-2002 Conference, Yokohama, Japan, Jul. 8, 2002, pp. 1-14.

Isaac Shpantzer, Ph.D. et al., "Coherent Optical Fiber Communication Architecture, Modeling and Optimization", CeLight Inc., SCEE 2002 Conference, Eindhoven, The Netherlands, Jun. 25, 2002, pp. 1-39.

M. Tseytlin et al., "Digital, endless polarization control for polarization multiplexed fiber-optic communications", CeLight Inc., OFC 2003, Mar. 24, 2003, pp. 1-14.

International Search Report for applicant's related International PCT Application PCT/CA2006/001459, Sep. 5, 2006.

International Search Report for applicant's related International PCT Application PCT/CA2006/001460, Sep. 5, 2006.

Richard A. Linke, et al., "High-Capacity Coherent Lightwave Systems", Journal of Lightwave Technology, vol. 6, No. 11, Nov. 1988, pp. 1750-1769.

Chul-Ho Shin, et al., "Heterodyne Optical Phase-Locked Loop by Confocal Fabry-Perot Cavity Coupled AlGaAs Laser", IEEE Photonoics Technology Letters, vol. 2, No. 4, Apr. 1990, pp. 297-300.

D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.

Frowin Derr, "Coherent Optical QPSK Intradyne System: Concept and Digital Receiver Realization", Journal of Lightwave Technology, vol. 10, No. 9, Sep. 1992, pp. 1290-1296.

D.-S. Ly-Gagnon, et al., "Unrepeatered optical transmission of 20 Gbit/s quadrature phase-shift keying signals over 210 km using homodyne phase-diversity receiver and digital signal processing", Electronics Letters, vol. 41, No. 4, Feb. 17, 2005, pp. 1-2.

Y. Cia, et al., "On Performance of Coherent Phase-Shift-Keying Modulation in 40 Gb/s Long-Haul Optical Fiber Transmission Systems", OFC, Mar. 2006, pp. 1-3.

Matthias Seimetz, "Performance of Coherent Optical Square-16-QAM-Systems based on IQ-Transmitters and Homodyne Receivers with Digital Phase Estimation", OFC, Mar. 2006, pp. 1-10.

U. Koc, et al., Digital Coherent Phase-Shift-Keying (QPSK), OFC, Mar. 2006, pp. 1-3.

Satoshi Tsukamoto, et al., "Coherent Demodulation of Optical 8-Phase Shift-Keying Signals Using Homodyne Detection and Digital Signal Processing", OFC, Mar. 2006, pp. 1-3.

Kazuro Kikuchi, "Coherent Detection of Phase-Shift Keying Signals Using Digital Carrier-Phase Estimation", OFC, Mar. 2006, pp. 1-3.

B. Spinnler, "Chromatic Dispersion Tolerance of Coherent Optical Communications Systems With Electrical Equalization", OFC, Mar. 2006, pp. 1-3.

R.I. Killey, et al., "Electronic dispersion compensation by signal predistortion", OFC, Mar. 2006, pp. 1-3.

Satoshi Tsukamoto, et al., "Unrepeated 20-Gbit/s QPSK Transmission over 200-km Standard Single-Mode Fiber Using Homodyne Detection and Digital Signal Processing for Dispertion Compensation", OFC, Mar. 2006, pp. 1-3.

Ezra Ip, et al., "Carrier Synchronization for 3-and 4-bit-per-Symbol Optical Transmission", Journal of Lightwave Technology, vol. 23, No. 12, Dec. 2005, pp. 4110-4124.

Yan Han, et al., "Coherent optical communication using polarization multiple-input-multiple-output", Optics Express, vol. 13, No. 19, Sep. 19, 2005, pp. 7527-7534.

L.E. Franks, "Carrier and Bit Synchronization in Data Communication-A Tutorial Review", IEEE Transactions on Communications, vol. COM-28, No. 8, Aug. 1980, pp. 1107-1121.

M. Cavallari, et al., "Electronic Signal Processing for Differential Phase Modulation Formats", OFC 2004, pp. 1-3.

A. Farbert, et al., "Performance of a 10.7 Gb/s Receiver with Digital Equaliser using Maximum Likelihood Sequence Estimation", ECOC 2004, Proceedings PD-TH4.1.5, Stockholm, pp. 1-2.

Yusuke Ota, et al., "High-Speed, Burst-Mode, Packet-Capable Optical Receiver and Instantaneous Clock Recovery for Optical Bus Opearation", Journal of Lightwave Technology, vol. 12, No. 2, Feb. 1994, pp. 325-331.

* cited by examiner

EFFICIENT DATA TRANSMISSION AND TRAINING OF DATA PROCESSING FUNCTIONS

CROSS-REFERENCE TO RELATED APPLICATIONS

This application claims benefit under 35 U.S.C. 119(e) from U.S. Provisional Patent Application Ser. No. 60/728,751, entitled Automatic Gain Control, which was filed on Oct. 21, 2005.

TECHNICAL FIELD

The present invention relates to optical communications networks, and in particular to methods and systems for efficient data transmission and. training of signal processing functions of a receiver.

BACKGROUND OF THE INVENTION

In the optical communications space, techniques used to detect data modulated onto an optical communications signal may be broadly grouped into two classes, namely "direct" detection and "coherent" detection. In "direct" detection techniques, the optical signal is made incident on a photodetector. The electrical current appearing at the photodetector output is proportional to the optical power which is the square of the optical Electric Field (E-Field) magnitude. Data modulated onto the optical signal power using an amplitude-modulation scheme, such as On-Off Keying (OOK) can thus be detected by analysis of the photodetector output current. Direct detection techniques have advantages in terms of low cost, and high reliability for On-Off Keying (OOK) based modulation schemes. As a result, the majority of optical receivers currently used in optical communications networks are based on direct detection.

In "coherent" detection techniques, the optical signal is mixed with a strong, narrow-line-width, local oscillator signal by an optical hybrid, and the combined signal made incident on one or more photodetectors. In some systems, the inbound optical signal is first split into orthogonal polarizations, and each polarization processed by a respective optical hybrid. In-phase and Quadrature components of each polarization can be detected using respective photodetectors positioned to receive corresponding signals output by the optical hybrid. The frequency spectrum of the electrical current appearing at the photodetector output(s) is substantially proportional to the convolution of the received optical signal and the local oscillator, and contains a signal component lying at an intermediate frequency that contains the data. Consequently, this "data component" can be isolated and detected by electronically filtering and processing the photodetector output current.

Coherent detection receivers offer numerous advantages over direct detection receivers, many of which follow from the fact that coherent detection techniques provide both phase and amplitude information of the optical signal. As such, more robust modulation schemes, such as binary phase shift keying (BPSK), quadrature phase shift keying (QPSK), and quadrature amplitude modulation (QAM) can be used.

However, receivers based on coherent detection techniques have suffered disadvantages that have, to date, prevented successful deployment in "real-world" installed communications networks. In particular, optical signals received through conventional optical links are distorted by significant amounts of chromatic dispersion (CD) and polarization dependent impairments such as Polarization Mode Dispersion (PMD), polarization angle changes and polarization dependent loss (PDL). Polarization effects of the fibre link tend to rotate the transmitted polarizations, so that, at the receiver, they will typically be neither orthogonal to each other nor aligned with the polarization beam splitter of the optical hybrid. As a result, each of the received polarizations (downstream of the polarization beam splitter) contain energy from both of the transmitted polarizations, as well as artefacts due to CD, PMD and PDL. These problems are compounded for polarization-division multiplexed signals, in which each transmitted polarization contains a respective different data signal. In such cases, each received polarization contains a mixture of both of the transmitted data signals, so that, in addition to compensating CD, PMD and PDL, it is also necessary to separate these data signals from one another.

Various methods have been proposed for addressing these problems. For example, a quadrature coherent receiver with electronic polarization compensation is described by R Noé, in: "Phase Noise-Tolerant Synchronous QPSK/BPSK Baseband-Type Intradyne Receiver Concept With Feedforward Carrier Recovery", Journal of Lightwave Technology, Vol. 23, No. 2, February 2005, and "PLL-Free Synchronous QPSK Polarization Multiplex/Diversity Receiver Concept with Digital I&Q Baseband Processing", IEEE Photonics Technology Letters, Vol. 17, No. 4, April 2005. In this respect, it will be noted that Noé also alludes (in the introduction) to the possibility of also compensating chromatic dispersion. However, Noé does not provide any teaching as to how this would be done. The applicability of RF channel estimation techniques to the detection of polarization-division multiplexed optical signals in a quadrature coherent receiver is described by Y. Han et al. in "Coherent optical Communication Using Polarization Multiple-Input-Multiple-Output", OPTICS EXPRESS Vol. 13, No. 19, pp 7527-7534, 19 Sep. 2005.

Figure 1:
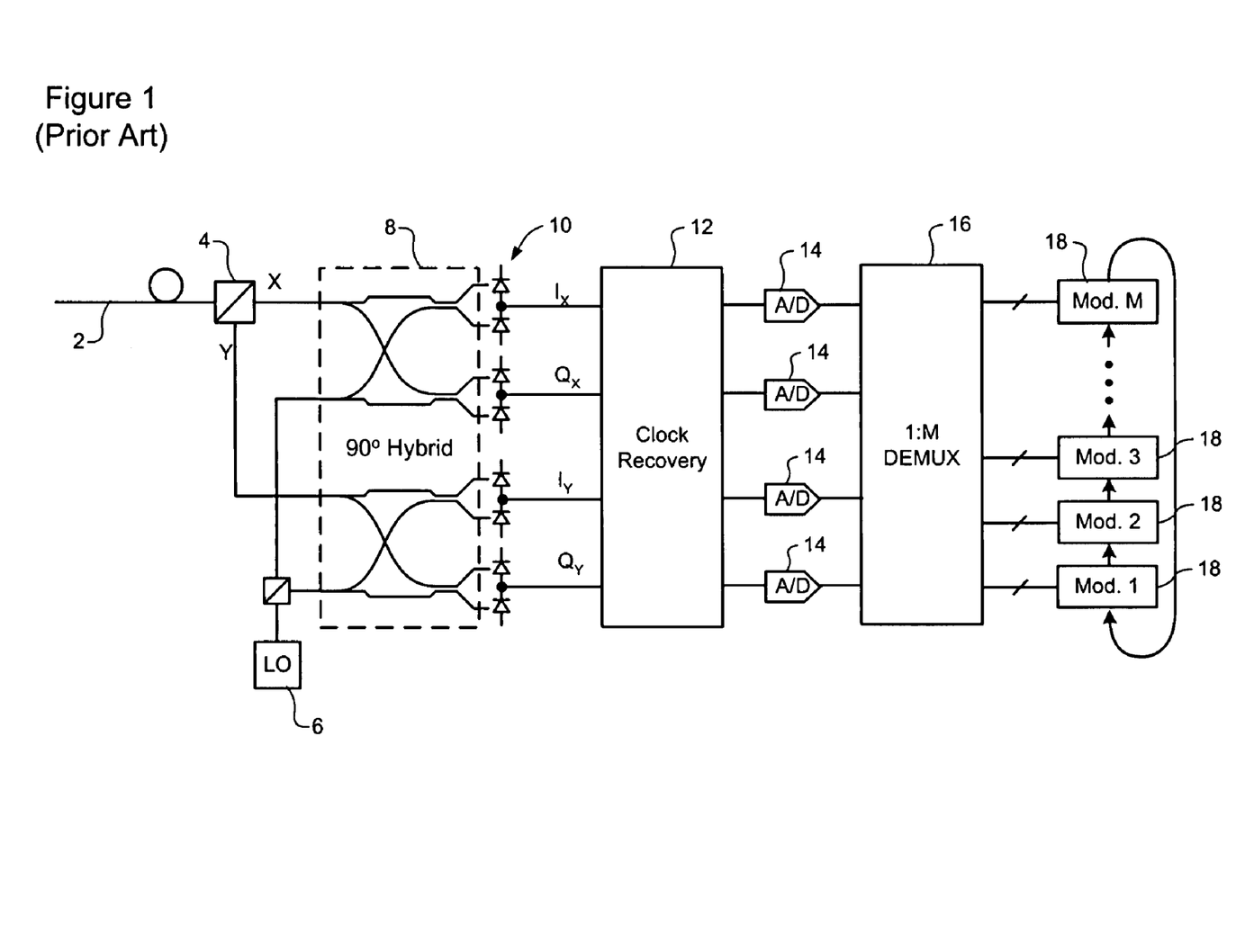
FIG. 1 is a block diagram schematically illustrating principal elements of a coherent optical receiver known in the prior art.

FIG. 1 schematically illustrates the system of Noé (Supra, April 2005). As may be seen in FIG. 1, an optical signal received through an optical link 2 is divided by a polarization beam splitter 4 into orthogonal polarizations (nominally referred to as X and Y polarizations in FIG. 1), which are then mixed with a local oscillator (LO) 6 through a quadrature 90° optical hybrid 8. The composite optical signals appearing at the output of the optical hybrid are made incident on a set of photodetectors 10 to generate analog electrical signals Ix, Qx, Iy, Qy respectively corresponding to real (Re) and imaginary (Im) parts of each polarization. These analog signals are then supplied to a clock recovery circuit 12, before being sampled at the symbol rate by respective Analog-to-Digital (A/D) converters 14 to generate digital sample streams of each of the real (Re) and imaginary (Im) parts of each polarization. The digital samples are then supplied to a 1:M DEMUXer 16, which splits the data path into M parallel sample streams having a lower sample rate (by a factor of M), each of which is supplied to a respective processing module 18. Within each processing module 18, an inverse Jones matrix that models the polarization performance of the optical link is used to compensate polarization distortions. This function requires communications between each of the processing modules 18, as may be seen by the arrows in FIG. 1, so as to ensure continuity of compensation between each of the M substreams. The polarization compensated samples can then be decoded for data recovery.

In practical networks, the inbound optical signal can exhibit very high speed polarization transients. For example, polarization angle transients (rotations) at rates in excess of 2 KHz are common, and rotation rates in excess of 20 KHz have been observed by the inventors. Because of the high sensitivity of coherent detection systems to polarization angle, any receiver intended to be deployed in a real-world communications network, as opposed to a computer simulation or laboratory bench-top, must be able to track (that is, compensate) these transients.

A further limitation of coherent receivers is that a frequency mismatch between the received carrier and the local oscillator appears as a time varying phase error in detected symbols. When phase error reaches $\pi/4$ for QPSK or $\pi/2$ for BPSK, a "cycle-slip" can occur, in which symbols can be erroneously interpreted as lying in an adjacent quadrant. This can result in the erroneous interpretation of every symbol (and thus all data) following the cycle-slip. Typically, this problem is overcome by implementing a differential encoding/decoding scheme, in which each symbol is compared to its immediately preceding symbol, and the symbol value decided based on the difference. However, differential decoding has a disadvantage in that a symbol error results in two errored symbols; the symbol directly affected by the symbol error, and the symbol that immediately follows it. This doubles the raw bit error rate. It is also noted that due to the interaction of laser linewidth and noise, most cycle slip events occur in a duration of quite a few symbols (10 to 40 typically).

Prior art receiver systems do not offer a cost-effective means of addressing the above issues. For example, the system of Noé cannot track high speed transients of the type encountered in real-world communications networks. This is due, at least in part, to the slow speed (i.e. M/g symbol durations) at which the inverse Jones matrix coefficients can be updated. Thus, for example, Noé, claims that with a 10 GBaud signal (M=16 and g=$10^{-4}$), the inverse Jones matrix coefficients can be updated with a period of 16 µs. This is far too slow to successfully track 20 KHz polarization rotations, which have a period of 50 µs. In addition, the system of Noé tends to fail in the presence of severe Chromatic Dispersion (CD), at least in part due to failure of the clock recovery circuit as inter-symbol interference (ISI) increases, and consequent uncertainty of the sample timing of the A/D converters. While it is mathematically possible to design a filter function that compensates both polarization and chromatic dispersion (as alluded to by Noé), the prior art does not offer any methods by which satisfactory compensation accuracy can be obtained with an adaptation speed high enough to track real-world polarization transients.

It is general practice for optical communications signals to include a periodic framing pattern, which normally defines a frame or packet comprising a payload for the transport of data, and an overhead containing addressing and timing information required to facilitate proper forwarding of the frame (or packet) as well as the insertion and extraction of payload data. The period of this frame pattern is chosen such as to not consume a significant fraction of the total symbols being transmitted. For example, the SONET OC-192 standard defines the A1 and A2 bytes that repeat at 8 KHz, which is a period of approximately 1,200,000 symbols. The G.709 OTN standard has framing periods of approximately 130,000 symbols. U.S. patent application Ser. No. 09/800,523, filed Mar. 8, 2001 describes a frame format that is tolerant to high error rates. The purpose of these frame patterns is to enable the detection of the location in time of the start of the frame so that the appropriate meanings can be assigned to the various byte locations within the frame, and then the appropriate parity and demultiplexing actions performed.

Packet protocols such as 10 G Ethernet define preambles in front of each packet to allow the identification of the start of the packet. These are identical for each packet.

All of the standard frame (packet) formats treat payload and overhead as a discrete unit. That is, data and overhead information is loaded into appropriate fields of the frame, and then transmitted as a unit to a receiver. Within the receiver, the received frame is buffered, and the content of each field read. None of the known framing techniques are directly applicable to physical (PHY) layer transport, for at least the reason that the meaning of each byte of the frame is determined by its location within the frame, and PHY-layer devices typically have no visibility of this information.

Accordingly, methods and techniques that enable efficient data transmission in an optical network, with cost-effective signal processing in a receiver unit remain highly desirable.

SUMMARY OF THE INVENTION

An object of the present invention is to provide methods and techniques that enable efficient data transmission in an optical network, with cost-effective signal processing in a receiver unit.

Thus, an aspect of the present invention provides a method of conveying data through an optical communications system. An optical signal is received through the optical communication system,. the optical signal comprising data symbols and SYNC bursts, each SYNC burst having a predetermined symbol sequence. The received optical signal is oversampled to generate a multi-bit sample stream. The sample stream is partitioned into blocks of contiguous samples, wherein each block of samples partially overlaps at least one other block of samples and encompasses at least one SYNC burst and a plurality of data symbols. Each block of samples is independently processed to detect a value of each data symbol.

A further aspect of the present invention provides a method of controlling a receiver of an optical system. An optical signal is received through the optical communication system, the optical signal comprising SYNC bursts having a predetermined symbol sequence. The received optical signal is oversampled using a nominal clock to generate a multi-bit digital sample stream having an indeterminate sample phase relative a symbol phase of the optical signal. A characteristic of each SYNC burst is detected. At least one signal processor of the receiver is then trained using the detected characteristic.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and techniques that enable efficient data transmission in an optical network, with cost-effective signal processing in a receiver unit. Embodiments of the present invention are described below, by way of example only, with reference to FIGS. 2-7b.

In general, the present invention provides a system in which periodic SYNC bursts are transmitted through an optical link and used in a receiver to enable efficient receiver training and data recovery. The format, content and repetition rate of the SYNC bursts is selected to facilitate detection even in the presence of significant impairments, while minimizing overhead. For example, in some embodiments, the overhead associated with the SYNC bursts is on the order of 3%. As a result, the performance penalty associated adding the SYNC bursts to the optical signal (and/or the loss of receiver sensitivity resulting from increasing the symbol rate of the optical signal to compensate for the additional overhead) is observable, but tolerable.

Figure 2A:
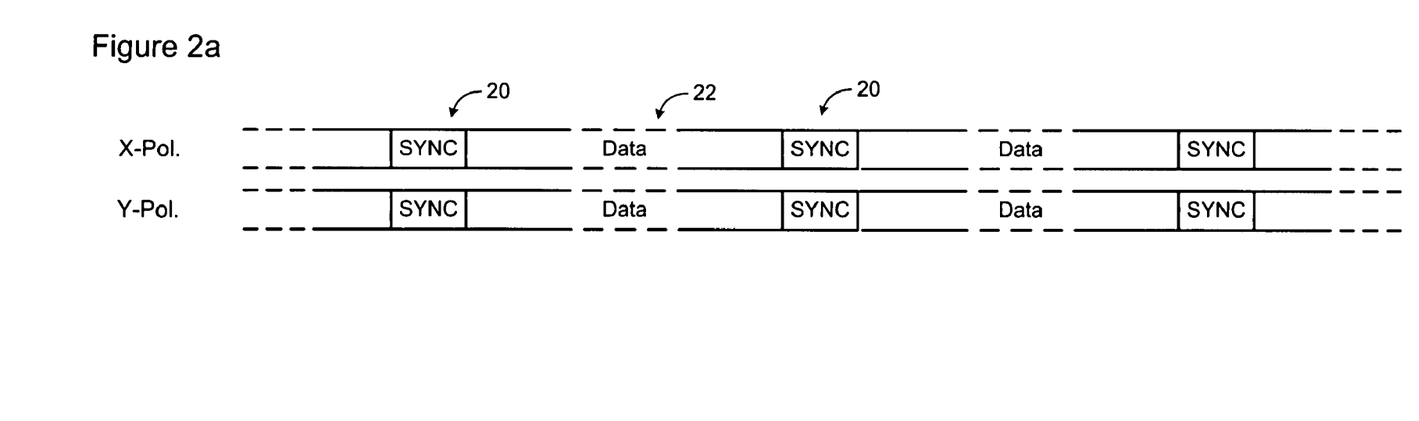
FIGS. 2a and 2b schematically illustrate respective different optical signals containing SYNC bursts in accordance with representative embodiments of the present invention.
Figure 2B:
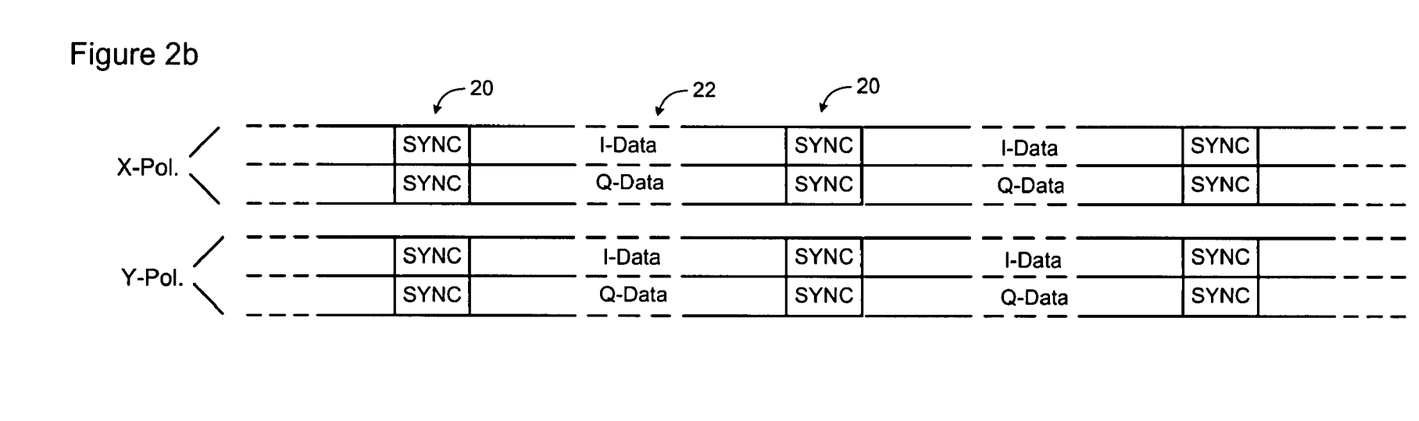

FIGS. 2a and 2b illustrate respective alternative optical signal formats which may be used in conjunction with embodiments of the present invention. In each of the illustrated embodiments, the optical signal includes nominally regularly spaced SYNC bursts 20 embedded within a stream of data symbols 22. Each SYNC burst 20 has a respective predetermined symbol (or, equivalently, bit) sequence on each transmitted polarization. The symbol (bit) sequences of each polarization are preferably transmitted simultaneously, but this is not necessary. In the embodiment of FIG. 2a, two orthogonal bit sequences are used in each SYNC burst; each bit sequence being assigned to a respective transmitted polarization. FIG. 2b illustrates an alternative arrangement, in which each of the I and Q components of each transmitted polarization is assigned a respective orthogonal bit sequence. As will be described in greater detail below, the signal format of FIG. 2b is beneficial in that in enables a SYNC detector within the receiver to independently detect each transmitted signal component of the optical signal.

In principle, virtually any symbol (or bit) sequence that can be reliably detected at a receiver may be used for the SYNC bursts 20. For example, the SYNC burst 20 could be provided as a string of binary 1's or 0's, which is sufficient for framing and signal partitioning in the receiver, as will be described below. More sophisticated receiver functions, such as polarization compensation, clock recovery and carrier recovery, for example, require a more sophisticated SYNC burst. In such cases, the selection of symbol sequences is preferably guided by the following considerations:

The length of each SYNC burst is a balance between Hamming distance and overhead. Increasing the length of the SYNC burst reduces the probability of erroneous detection in a sample stream of the optical signal, but at a cost of increasing overhead in the optical signal. In some embodiments, a SYNC burst length of between 17 and 24 symbols is suitable. Where limited receiver training is desired, a very short SYNC burst length may be sufficient. For example, a burst length of 4-8 symbols is sufficient for estimating initial carrier phase to remove phase ambiguity in a data decoder.

The pattern of SYNC symbols is preferably selected such that the auto-correlation is very high when the symbol pattern is exactly aligned with itself, and very low everywhere else. This enables the receiver to accurately detect the timing of the SYNC bursts, which facilitates partitioning and parallel processing of the sample stream, as will be described in greater detail below.

The pattern of SYNC symbols is preferably selected such that known correlation techniques can detect a SYNC burst in the presence of significant residual dispersion. For example, during system start-up, initial dispersion compensation at a receiver will normally be based on assumptions about link impairments, so that there will be significant residual dispersion in a sample stream derived from the optical signal. Robust detection of the SYNC bursts, even in the presence of such residual dispersion facilitates training of compensators at the receiver. One way of accomplishing this is to design the pattern of SYNC symbols to contain frequency components significantly below the symbol rate of the optical signal. This yields SYNC bursts that are significantly less sensitive to dispersion than the rest of the optical signal.

In embodiments in which equalization of channel impairments is desired, the pattern of SYNC symbols is preferably selected to be spectrally white. This improves the auto-correlation properties of the SYNC bursts, which in turn assists in training channel dispersion compensation loops. Where there is a need to separate different channel information, is is also desirable that the cross correlation spectrum should be as white as possible.

Representative bit patterns which satisfy the above considerations, for the case of respective bit sequences on each of the I and Q components of each transmitted polarization, include (but are not limited to):

| SYNC | Bit Pattern |
|---|---|
| I (X-Polarization) | 00101 00011 01111 10; |
| Q (X-Polarization) | 01011 00000 10011 10; |
| I (Y-Polarization) | 01010 01100 00001 10; |
| Q (Y-Polarization) | 00001 00100 01110 10; |

Representative bit patterns which satisfy the above considerations, for the case of a single respective bit sequence phase or amplitude modulated on each transmitted polarization, include (but are not limited to):

| SYNC | Bit Pattern |
|---|---|
| X-Polarization | 00101 00011 01111 10; |
| Y-Polarization | 00001 00100 01110 10; |

As will be appreciated, the above considerations apply equally to optical signals having one or two transmitted polarizations. It should also be noted. that the present invention also encompasses cases in which the optical signal is unpolarized, such as, for example, may be generated by a non-coherent light source such as a light emitting diode (LED). In such cases, the SYNC burst 20 would normally be composed of a single bit pattern, amplitude modulated onto the optical signal.

If desired, the same symbol sequence can be transmitted in every SYNC burst 20. Alternatively, the symbol sequence can be changed, for example at predetermined intervals. In preferred embodiments, each SYNC burst 20 comprises a block of contiguous SYNC symbols, but this is not essential.

Any desired modulation scheme may be used to modulate the SYNC burst 20 onto the optical signal. Furthermore, this modulation scheme may or may not be the same as that used to modulate data symbols onto the optical signal.

Preferably, the SYNC bursts 20 are transmitted at a fixed repetition rate, which results in a fixed, predetermined number of data symbols 22 between successive SYNC bursts 20. However, this is not essential. A moderate amount of variation in the separation between successive SYNC bursts 20 is acceptable.

In general, any number of data symbols 22 may be inserted between the SYNC bursts 20, up to a maximum limit determined by the symbol rate of the optical signal and the interval between any two successive SYNC bursts 20. Data symbols may be arranged either continuously or discontinuously between SYNC bursts 20, as desired. Any desired modulation scheme may be used to modulate the data symbols 20 onto an optical carrier. In some embodiments, two or more data streams may be multiplexed together. In some embodiments, the data streams may be FEC encoded. In some embodiments, a QPSK modulation scheme may be used. In some embodiments, data may be modulated onto orthogonally polarized carriers and transmitted together to form a Polarization-Division Multiple Access optical signal.

While the interval between SYNC bursts 20 can be of any convenient length, or range of lengths, it is desirable to limit the interval to a fixed even number of data symbols 22, which facilitates sample stream partitioning and parallel processing in the receiver, as will be described in further detail below. In addition, it is desirable to ensure that the repetition rate of the SYNC bursts 20 is high enough to facilitate operation of high-speed training loops in the receiver, which enable accurate tracking and compensation of high-speed impairment transients. As will be appreciated, this will tend to limit the maximum desirable separation between SYNC bursts 20. Additionally, in some embodiments it may be desired to rely upon Forward Error Correction (FEC) encoding to correct errored bits resulting from cycle slips. In such cases, the SYNC bursts 20 serve to constrain the maximum possible number of errored data symbols following a cycle slip. The length of this effect of one cycle slip depends upon where the cycle slip occurred in the optical signal, relative the location of the termination mechanism. With bidirectional decoding (see FIGS. 7a and 7b) from each SYNC burst 20, the maximum length of the effect of a single cycle slip is half of the number of data symbols between SYNC bursts 20. It is desirable that the separation between SYNC bursts 20 should be set small enough that the chosen FEC encoding scheme can correct at least this maximum possible number of errored symbols. Alternatively, the length can be chosen such that the FEC can correct at least the mean length of the effect of cycle slips. Depending on the FEC encoding scheme used, these later considerations may result in a separation between SYNC bursts 20 of less than 1000 symbols.

The FEC can be specifically designed to recognize and correct a cycle slip. To facilitate this, the carrier recovery circuit can detect the probable occurance of a cycle slip, and indicate this to the FEC circuit. A desirable implementation of this is to overlap the bidirectional data decoding (including carrier recovery) and then determine if there is a cyclic difference between the same symbols decoded in each direction. Such a difference is either due to a specific pattern of bit errors, or due to a cycle slip.

The FEC circuit can be arranged to be tolerant of a cycle slip, when the effect of the cycle slip is appropriately constrained. For example, the pattern or placement of the data symbols within the FEC blocks can be chosen such as to tolerate this constrained effect.

Figure 3:
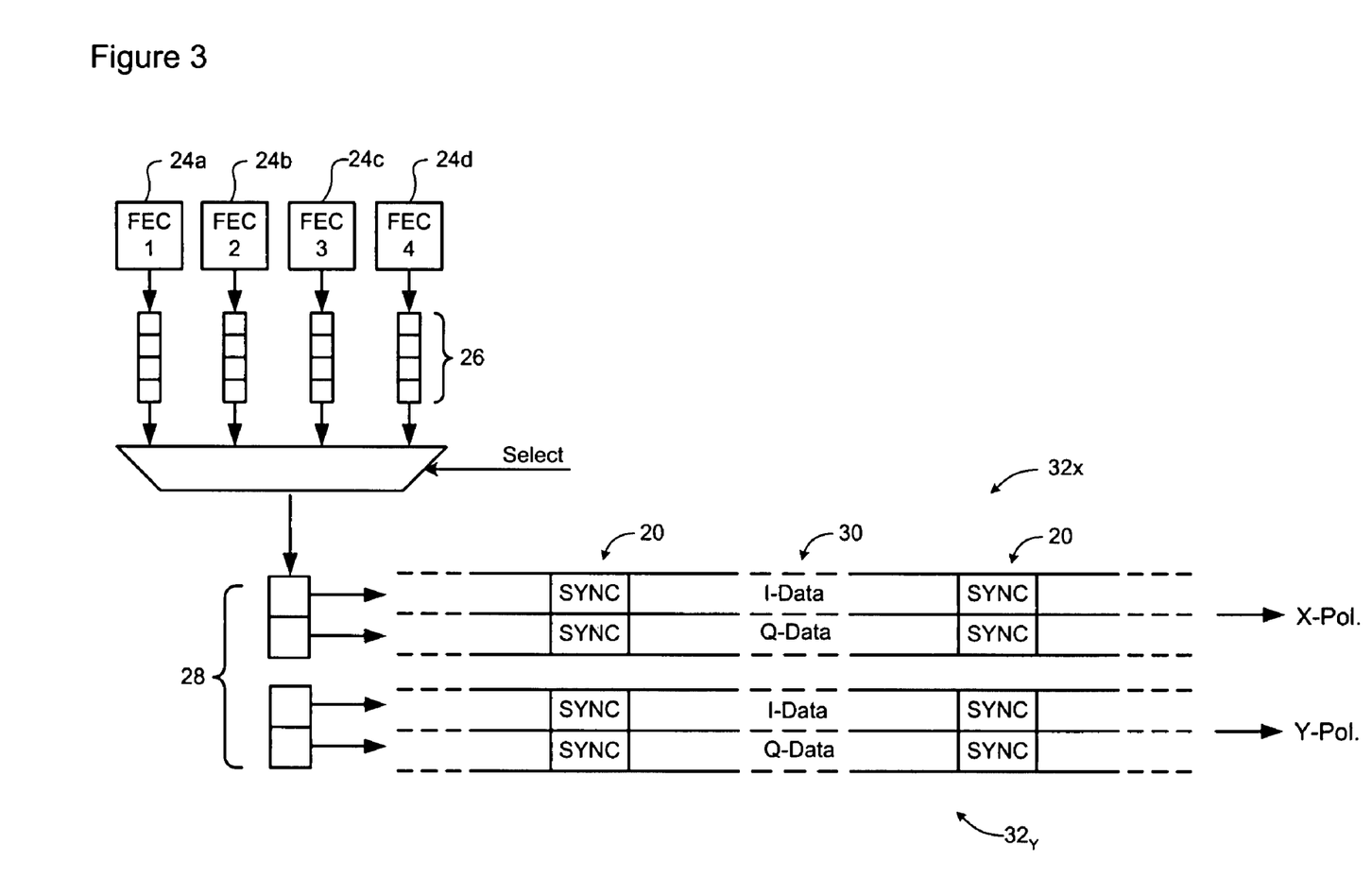
FIG. 3 is a schematic illustration showing a representative method of generating the optical signal of FIG. 2b.

By way of example only, the optical signal of FIG. 2b may be generated as shown in FIG. 3. Thus, four FEC-encoded data streams 24 are divided into four-bit words 26 and multiplexed together. The resulting four-bit parallel digital data stream 28 is then packetized into data packets 30 of, for example, 744 symbols in length. SYNC bursts 20 having four parallel bit sequences, one for each bit of the four-bit parallel digital data stream 28, are then inserted between successive data packets 30. The resulting four-bit parallel digital signal is then treated as two parallel QPSK symbol streams 32, which are then modulated onto respective polarizations of a Polarization-Division Multiple Access optical signal. The symbol rate of the optical signal may be in excess of 2.5 GHz.

Figure 4:
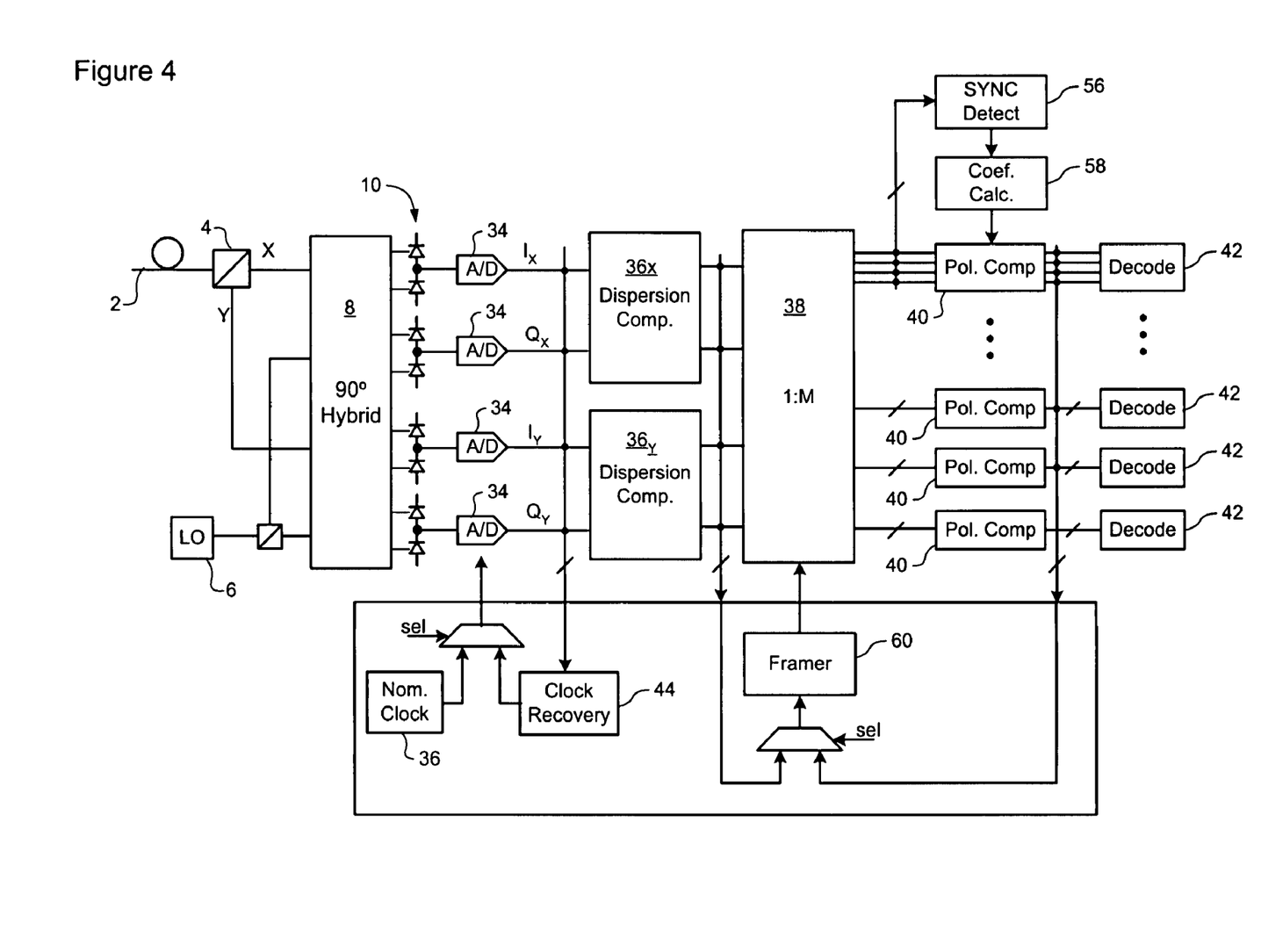
FIG. 4 is a block diagram schematically illustrating principal elements and operations of a coherent optical receiver in accordance with an aspect of the present invention.

FIG. 4 schematically illustrates a representative coherent optical receiver in which the above-described optical signal format is used to enable robust clock recovery, impairment compensation and data decoding.

In the coherent optical receiver of FIG. 4, an inbound optical signal is received through an optical link 2, split into orthogonal polarizations by a Polarization Beam Splitter 4, and then mixed with a Local Oscillator (LO) signal 6 by a conventional 90° optical hybrid 8. The optical signal may, for example, be a high speed optical signal of the type described above with reference to FIGS. 2b and 3. The composite optical signals emerging from the optical hybrid 8 are supplied to respective photodetectors 10, which generate corresponding analog signals. The photodetector signals are sampled by respective Analog-to-Digital (A/D) converters 34 to yield multi-bit digital sample streams corresponding to In-phase (I) and Quadrature (Q) components of each of the received polarizations. Although two photodetectors are shown for each A/D in FIG. 4, in some embodiments only one photodetector can used for each A/D with satisfactory performance.

As may be appreciated, the resolution of the A/D converters 34 is a balance between performance and cost. Increasing the resolution improves sampling accuracy, and thereby improves the extent to which signal distortions can be corrected by downstream dispersion and polarization compensators. However, this increased accuracy is obtained at a cost of increased complexity, silicon area and heat generation. It has been found that a resolution of less than 4 bits is insufficient for satisfactory dispersion and polarization compensation. In practice, a resolution of 5 or 6 bits provides satisfactory performance, at an acceptable cost.

At least initially, the A/D converters 34 are driven by a nominal clock 36, which ensures a desired sample rate, but with an unknown timing relative to the received optical signal. This generates a set of multi-bit sample streams, each having an indeterminate sample timing, at the A/D converter outputs. Preferably, the nominal clock speed, and thus the sample rate of the A/D converters 34, is selected to satisfy the Nyquist criterion, for the highest anticipated symbol rate of the received optical signal. As will be appreciated, Nyquist sampling ensures that the sample streams generated at the A/D converter outputs contain all of the information content of each signal, even if the sample timing (with reference to each received symbol) is ambiguous and/or unknown.

From the A/D converter 34 block, the I and Q sample streams of each received polarization are supplied to a respective dispersion compensator 36, which operates on the sample stream(s) to compensate chromatic dispersion of the optical link. Various methods are known for performing this function, such as, for example Finite Impulse Response (FIR) filters.

As is known in the art, the amount of chromatic dispersion that can be- compensated in this manner depends on the width (in samples) of the filter. In preferred embodiments, a filter width of 50 or more samples may be used, in order to provide a satisfactory balance between compensation performance and cost. A filter width of 256 samples has been found to enable compensation of even severe chromatic dispersion ($\geqq 10,000$ ps/nm) at acceptable cost. A training loop for calculating the dispersion compensator coefficients (and thereby training the dispersion compensator) can be implemented using known methods. Thus, for example, the total chromatic dispersion can be measured using any of a variety of known methods, and the measured dispersion used to compute updated filter coefficients which are then downloaded to the dispersion compensators 36.

As is well known in the art, filters with large numbers of coefficients are not able to be adapted in a manner that is simultaneously rapid and accurate in the presence of additive noise. Thus, when compensating for significant amounts of chromatic dispersion, the adaptation response time (that is, the training-loop delay required to measure dispersion; compute updated coefficients; and download them to the dispersion compensators 36) will typically be greater than one millisecond, in order to provide sufficient accuracy. In some embodiments, significantly longer adaptation response times (e.g. on the order of a second or more) are sufficient to track observed variation rates in chromatic dispersion.

The dispersion-compensated sample streams appearing at the output of the dispersion compensators 36 are then supplied to a 1:M distribution unit 38, which operates to divide the signal path, by selectively routing blocks of samples from the dispersion compensators 36 into each one of the M paths. Within each path, a polarization compensator 40 operates to de-convolve the transmitted I and Q signal components of each polarization from the dispersion-compensated sample streams. The distortion-compensated sample streams appearing at the output of each polarization compensator 40 are then supplied to a respective decoder 42 for detection of data symbols and recovery of data.

The above described SYNC bursts 20 can advantageously be used within the receiver to provide high speed and provably reliable training of clock recovery, polarization compensation, framing and signal partitioning, carrier recovery, and decoding operations. Each of these operations will be described below in greater detail, with reference to FIGS. 4-7b.

Clock Recovery

Figure 5:
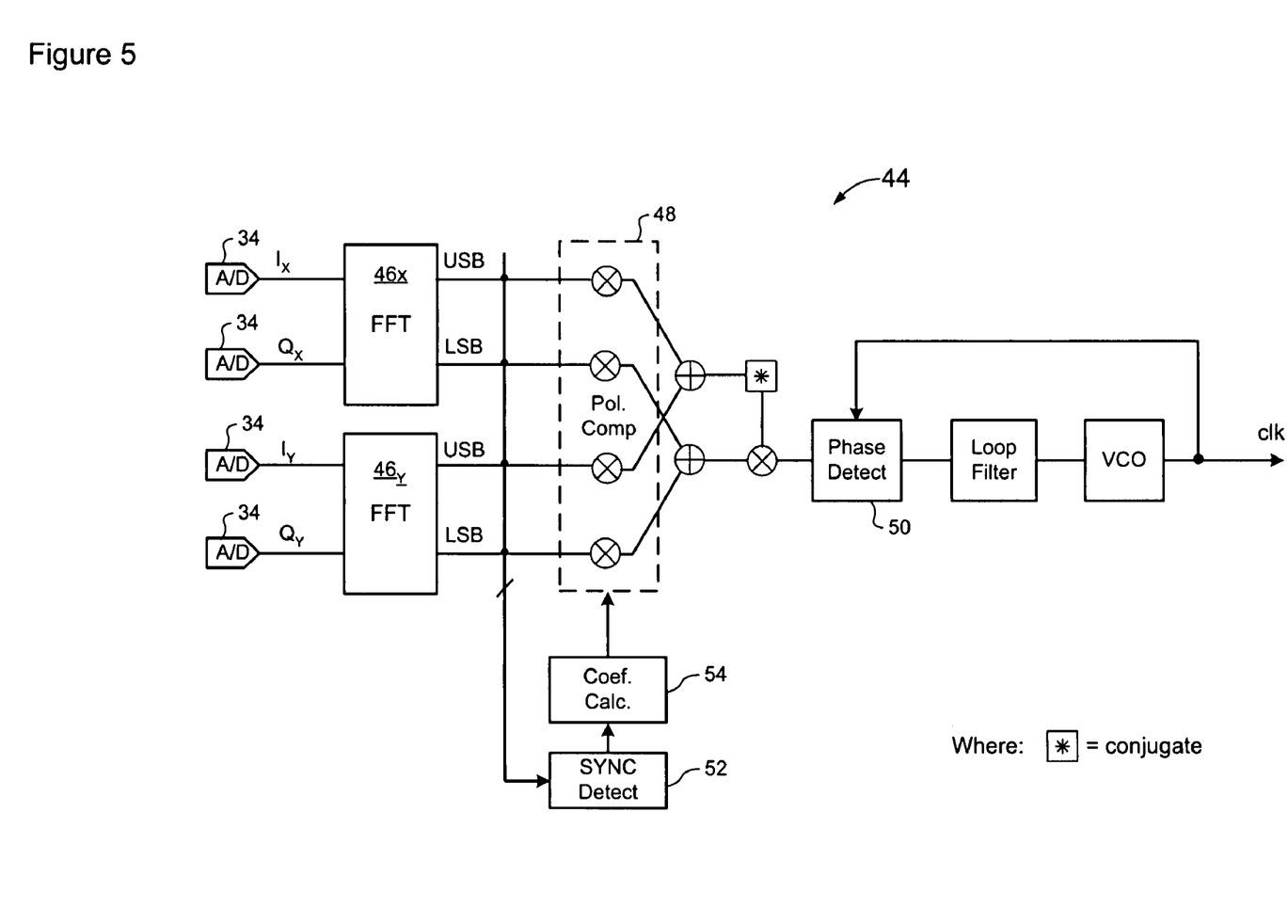
FIG. 5 is a block diagram schematically illustrating principal elements and operations of a clock recovery circuit usable in the receiver of FIG. 4.

FIG. 5 illustrates a representative clock recovery circuit 44 for recovering a clock signal from a highly distorted optical signal. In the embodiment of FIG. 5, the multi-bit sample streams generated by the A/D converters 34 are supplied to Fast Fourier Transform (FFT) filters 46, which analyse their spectral content. At the output of the FFT filters 46, respective Upper Side Band (USB) and Lower side Band (LSB) signals of each polarization are tapped and supplied to a polarization compensator 48, which implements a simplified polarization compensation function. The compensated USB and LSB signals appearing at the output of the polarization compensator 48 are then combined as shown in FIG. 5, and the resulting signal supplied to the phase error detector circuit 50 of a conventional digital Phase Locked Loop (PLL) clock recovery circuit.

In combination with the low frequency content of the SYNC symbol patterns, tapping the Upper and Lower side bands has the effect of rendering the SYNC bursts 20 detectable, even in the presence of severe dispersion and polarization impairments. As a result, a SYNC detector 52 can implement known correlation techniques to detect each SYNC symbol pattern in each of the upper and lower side band signals. Based on the calculated correlations, a coefficient calculator 54 can calculate filter coefficients that will compensate polarization impairments with sufficient accuracy to enable the PLL to obtain frequency/phase lock.

As mentioned above, the polarization compensator 48 implements a simplified polarization compensation function, which partially compensates polarization impairments. For example, the polarization compensator 48 may implement an inverse Jones matrix having only two parameters, namely $\theta_p$ and $\phi_p$. Limiting the degrees of freedom of the inverse Jones matrix in this manner reduces the computational complexity of the coefficient calculator 54, while still achieving sufficient performance to enable reliable clock recovery.

Once the PLL has achieved frequency/phase lock, the recovered clock signal can be used to drive the A/D converters 34, as well as the dispersion compensators 36, distribution unit 38, "main" polarization compensators 40 and data decoders 42. Once each of these units has stabilized, it is possible to recover a clock signal from the output of the polarization compensators 40 of the main data path.

An alternative clock recovery method operates on the sample blocks generated by the distribution unit 38 described in greater detail below. In this case, the phase and/or frequency of a symbol clock, representative of the symbol rate within a block of samples can be determined using methods described by L. E. Franks in *Carrier and Bit Synchronization in Data Communication—a Tutorial Review*, IEEE Transactions on Communications, Vol.. Com-28, No. 8, August 1980. This information can be used to adjust the A/D converter sampling clock for future samples, thereby forming a phase-locked loop. Alternatively, the symbol clock can be used in performing interpolation between the existing samples of the sample block to derive interpolated samples which closely approximate the timing (i.e. the phase) of symbols within the sample block. Interpolation methods such as Fourier interpolation are known in the art of digital signal processing. If there is a sufficient degree of oversampling, such as 4× or 10× the symbol rate, for example, interpolation may not be required and a reasonably close sample can be chosen for each symbol. Once a set of samples that are adequately aligned with the symbols have been identified (or derived by interpolation) the set of samples can then be decoded to determine the values of those symbols.

Polarization Compensation

In general, the polarization compensator(s) 40 receive the four dispersion-compensated sample streams, and output respective sample streams corresponding to the original I and Q signal components of each transmitted polarization. Various methods may be used to implement the polarization compensators 40, such as, for example, a Finite Impulse Response (FIR) filter.

As will be appreciated, successful de-convolution of the transmitted I and Q signal components, in the presence of high-speed polarization transients, requires continuous high-speed training of the polarization compensators 40. In effect, this means that the filter coefficients must be recalculated with sufficient speed and frequency to accurately track changes in the polarization state of the received optical signal. Note that it is not generally sufficient to be able to not lose track during transients, as excessive bit errors must not occur during the transient due to imperfect tracking. The prevention of cross-talk in cross-polarized signals is especially challenging. For optical links in which maximum polarization transients of 2 KHz or less are expected, a recalculation frequency as low as 100 KHz may be sufficient. As the anticipated polarization transient rates increase, so too must the recalculation frequency of the filter coefficients. Thus, in some embodiments, recalculation rates in excess of 1 MHz will be desired. In one embodiment, a SYNC detector 56 (FIG. 4) can implement known correlation techniques to detect the symbol sequence(s) of each SYNC burst 20 within each of the dispersion-compensated sample streams. The correlation coefficients calculated by the SYNC detector 56 can then be used by a coefficient calculator 58 to compute updated filter coefficients which are then downloaded to the polarization compensator 40.

In some embodiments, the SYNC burst frequency is about 1000 times lower than the symbol rate of the optical communications signal. Thus, for an optical communications system in which the symbol rate is 10 GHz, the SYNC burst frequency will be about 10 MHz. The small size of the polarization compensator (as low as 5 samples wide) enabled by the separation of dispersion and polarization compensation functions in the receiver of FIG. 4 means that the SYNC detector 56 and coefficient calculator 58 can form a "high-speed" training loop capable of re-computing and downloading the filter coefficients during the interval between successive SYNC bursts. Such frequent coefficient updating facilitates near real-time tracking and compensation of polarization transients having rates well in excess of 50 KHz.

Framing and Signal Partitioning

In general, the distribution unit 38 operates to partition the dispersion compensated sample stream into M parallel sample streams, each of which can be processed at a lower sample rate (by a factor of M).

Figure 6A:
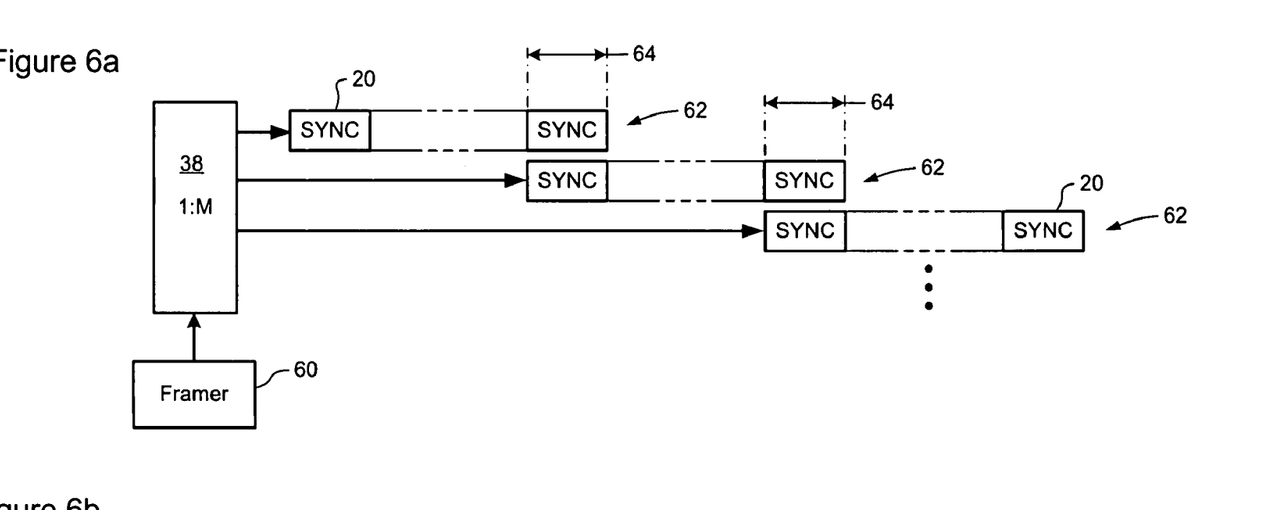
FIGS. 6a and 6b schematically illustrate respective different sample blocks generated by the distribution unit of FIG. 4.

In the illustrated embodiments, the distribution unit 38 is implemented as a "burst switch" controlled by a framer 60, to generate overlapping blocks of samples 62 (FIG. 6). One implementation of a burst switch may, for example, include a multi-port Random Access Memory (RAM), which allows samples to be simultaneously supplied to two or more data paths. FIG. 6a shows an embodiment in which each block of samples 62 encompasses two consecutive SYNC bursts 20, and any data symbols lying between them. In this case, the amount of overlap 64 between data blocks 62 in adjacent data paths is nominally equivalent to one SYNC burst. In some cases, it may desirable to increase the amount of overlap (e.g. by about the width of the polarization compensators) to ensure continuity of polarization compensation across all of the samples encompassing both of the involved SYNC bursts.

Figure 6B:
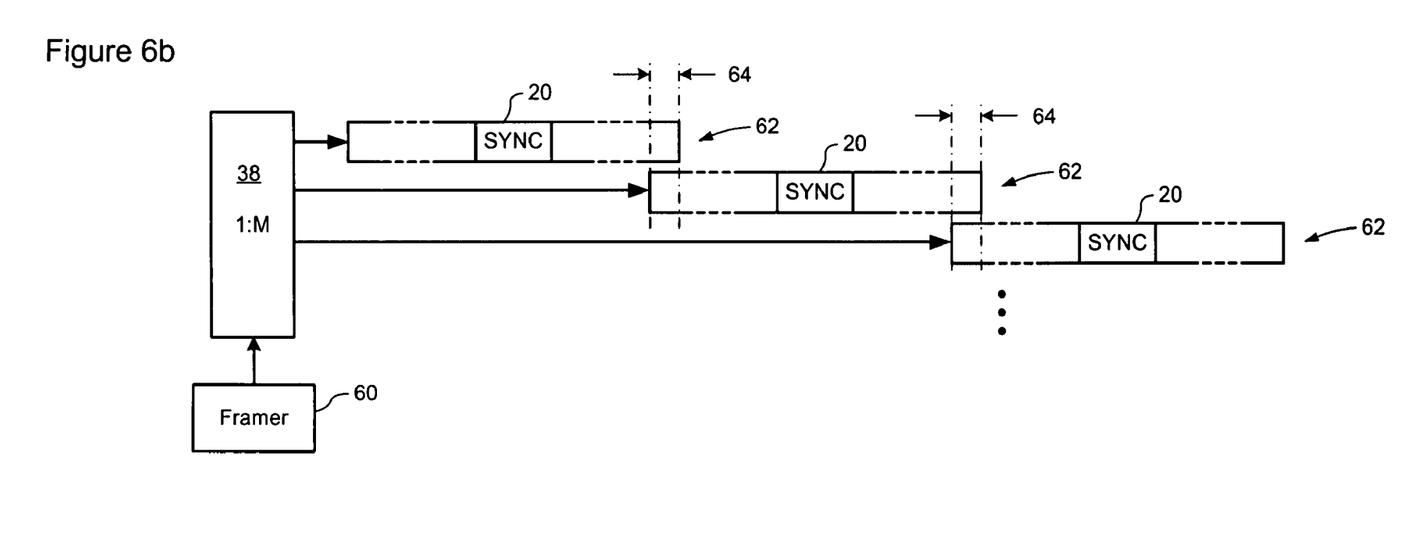

In the embodiment of FIG. 6b, each block of samples 62 is centered on a SYNC burst 20, and nominally spans half of the samples between the involved SYNC burst 20 and each of the immediately preceding and following SYNC bursts. A number of "buffer" samples, equal to the width of the polarization compensator, are added at each end of the sample block to ensure continuity of polarization compensation. These buffer samples, define the minimum desirable amount of overlap 64 between data blocks 62 in adjacent data paths.

The sample block formats of FIGS. 6a and 6b offer the advantage that each sample block 62 contains sufficient information, in their respective SYNC burst(s) 20, to enable polarization compensation and data decoding substantially independently of any other data path. This greatly simplifies the receiver architecture, and increases data processing speed, as compared to conventional systems (such as described by Noé, Supra) that require communication between processing modules 18 in adjacent paths (see FIG. 1).

The framer 60 may, for example, use various correlation techniques to detect the timing of each SYNC burst 20 with the dispersion compensated signal stream(s). In one embodiment, techniques similar to those described above for clock recovery can be used to enable detection of SYNC bursts 20 even in the presence of severe polarization impairments. As may be appreciated, during a start-up phase, it is not necessary for this operation to be perfect. In fact, it is sufficient that the framer 60 control the distribution unit 38 with sufficient accuracy that each sample block 62 supplied to each data path contains an intact SYNC burst 20. When this condition is satisfied, the SYNC detector 56 and coefficient calculator 58 can successfully operate to provide compensation of the polarization impairments. Once the polarization compensators 40 have stabilized, the framer 60 can use the polarization compensated sample streams to accurately determine the SYNC burst timing.

Carrier Recovery

A carrier recovery loop is provided to track fast carrier phase changes due to laser linewidth. In some embodiments, the carrier recovery function is integrated within each polarization compensation loop, and thus is performed independently within each of the data paths. A 2nd-order carrier recovery loop or feedforward carrier recovery (e.g., fourth power of the signal) can be employed. While the carrier offset frequency can be estimated and carried over from an immediately preceding sample block (that is, M SYNC bursts 20 ahead of the current sample block 62) it is desirable to estimate the initial carrier phase using the SYNC symbols (or a portion of them). Use of SYNC symbols to estimate the initial carrier phase in this manner also eliminates carrier phase ambiguity.

In one embodiment, the coefficient update of the polarization compensators 40 can be described as follows. Use the SYNC symbols (or a portion of them) to estimate the initial carrier phase, and then train the compensator 40 using the known SYNC symbols to form the error signals using a conventional Least-Mean Squared.(LMS) algorithm, which updates the filter coefficients and carrier phase jointly. After the SYNC symbols have been processed, switch from training mode to decision-direction mode to process the samples encompassing data symbols. At the end of the sample block 62, keep the filter coefficient and carrier offset frequency information for the next sample block 62 (i.e., M SYNC bursts later). The use of SYNC symbols helps the compensator convergence and remove polarization ambiguity.

Decoding

Figure 7A:
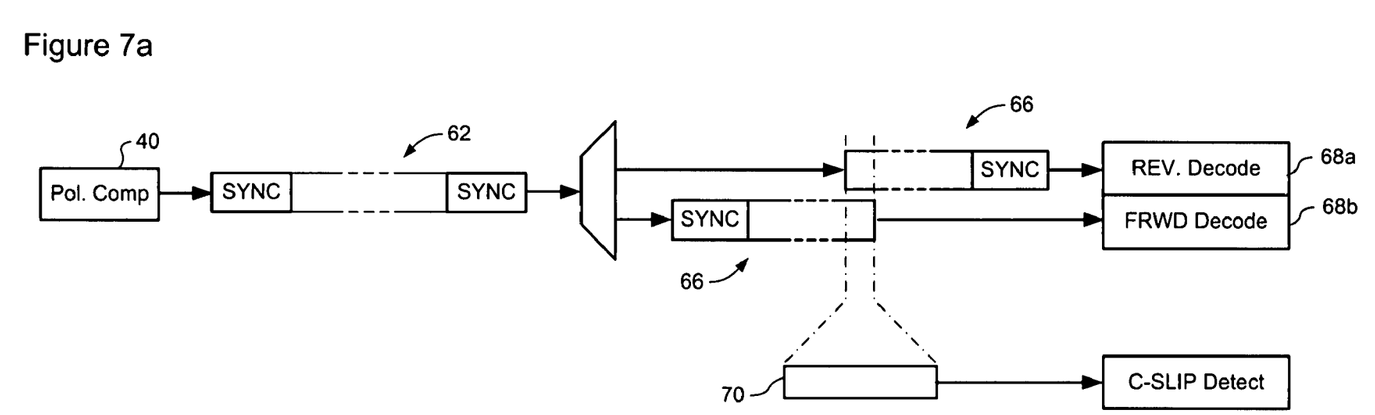
FIGS. 7a and 7b schematically illustrate principal operations of decoders for decoding the sample blocks of FIGS. 6a and 6b, respectively.

A decoder 42 connected downstream of each polarization compensator 40 can implement known methods to detect symbol and/or data values from the distortion compensated signals output from the polarization compensators 40. In the embodiment of FIG. 7a, the decoder receives polarization compensated sample blocks 62 having the format of FIG. 6a. As may be seen in FIG. 7a, each sample block 62 is partitioned into overlapping sub-blocks 66, each of which includes a respective SYNC burst 20. Each sub-block 66 is then supplied to a respective decoder 68, which detects the value of each data symbol within the sub-block 66. In this respect, it will be appreciated that the respective SYNC burst 20 of each sub-block 66 enables training of the decoder 68 for that sub-block 66, and thus reduces the probability of errors. Since the value of each SYNC sample is known, the decoder 68 can readily detect errored SYNC sample values such as may be produced by a cycle slip. This provides an effective means of constraining the effect of cycle slips, so that the string of errored samples does not continue past the SYNC burst 20. In addition, since each sub-block 66 is decoded independently, the effect of a cycle slip in one sub-block 66 is inherently constrained to that sub-block 66. As a result, a cycle slip occurring anywhere within the optical signal can affect a maximum of half of the data symbols lying between any two SYNC bursts 20.

As may be seen in FIG. 7a, the samples lying within the overlap region 70 between the sub-blocks 66 provides a means of detecting probable cycle slips. In particular, the overlap samples 70 will be processed by both decoders 68. If no cycle slips have occurred within the sample block 62, then this duplicated processing should yield identical results for the overlap samples 70. Any difference between the decoding results generated by the two decoders 68, for the overlap samples 70, can thus be used as an indicator that a probable cycle slip has occurred.

Figure 7B:
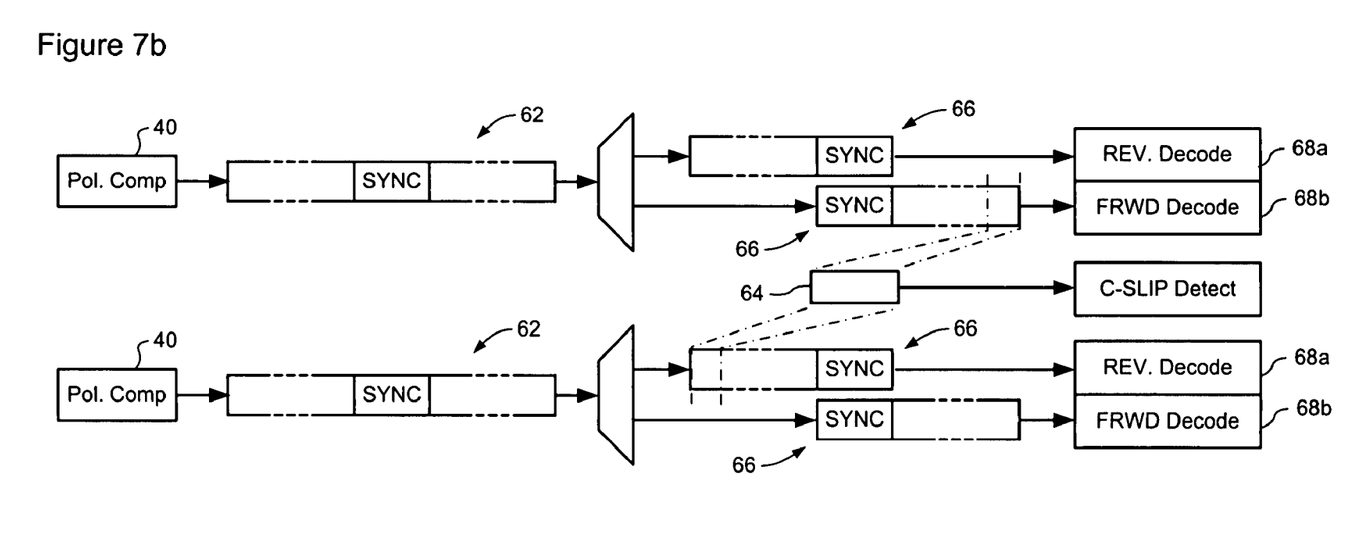

The embodiment of FIG. 7b is similar to that of FIG. 7a, except that it operates using the sample block format of FIG. 6b. As in the embodiment of FIG. 7a, the sample block 62 is divided into a pair of overlapping sub-blocks 66, each of which contains a SYNC burst 20. Each sub-block 66 is independently decoded, so that effects of cycle slips constrained to a maximum of half of the data symbols lying between any two SYNC bursts 20. If desired, detection of probable cycle slips can be accomplished by comparing the respective detection results of the overlapping portions 64 of the sample blocks 62 in adjacent data paths. In this case, the amount of overlap 64 between sample blocks would preferably be increased beyond the minimum described above with reference to FIG. 6b, to provide a set of overlap samples 64 that will not be affected by edge effects in the polarization compensators.

The embodiments of the invention described above are intended to be illustrative only. The scope of the invention is therefore intended to be limited solely by the scope of the appended claims.

We claim:

1. A method of conveying data through an optical communications system, the method comprising the steps of:
   receiving an optical signal through the optical communication system, the optical signal comprising data symbols and SYNC bursts, each SYNC burst having a predetermined symbol sequence;
   over-sampling the received optical signal to generate a multi-bit sample stream;
   partitioning the sample stream into blocks of contiguous samples, wherein each block of samples at least partially overlaps at least one other block of samples and encompasses at least one SYNC burst and a plurality of data symbols, wherein an overlap region of each data block comprises a plurality of samples which are duplicates of a corresponding plurality of samples in a respective overlap region of at least one other block; and
   independently processing each block of samples to detect a value of each data symbol.

2. A method as claimed in claim 1, wherein the predetermined symbol sequence comprises a respective predetermined symbol sequence on each transmitted polarization of the optical signal.

3. A method as claimed in claim 2, wherein the respective predetermined symbol sequence on each transmitted polarization comprises a pair of orthogonal bit sequences respectively allocated to In-phase and Quadrature components of the respective transmitted polarization.

4. A method as claimed in claim 2, wherein the optical signal includes two transmitted polarizations, and the predetermined symbol sequences on each transmitted polarization are orthogonal to each other.

5. A method as claimed in claim 1, wherein the data symbols comprise respective data symbols of at least two data streams multiplexed together.

6. A method as claimed in claim 1, wherein at least a portion of the data symbols correspond with a FEC encoded data stream.

7. A method as claimed in claim 6, wherein an FEC encoding scheme used to encode a data stream is designed to enable correction of at least a mean anticipated number of errored bits resulting from a cycle slip.

8. A method as claimed in claim 7, wherein an FEC encoding scheme used to encode the data stream is designed to enable correction of a maximum anticipated number of errored bits resulting from a cycle slip.

9. A method as claimed in claim 1, wherein each block of samples encompasses a pair of successive SYNC bursts.

10. A method as claimed in claim 1, wherein each block of samples comprises a SYNC burst and at least half of the samples lying between the SYNC burst and either one of an immediately preceding and an immediately following SYNC burst.

11. A method as claimed in claim 10, wherein each block of samples comprises a SYNC burst and at least half of the samples respectively lying between the SYNC burst and both of the immediately preceding and immediately following SYNC bursts.

12. A method as claimed in claim 1, wherein the step of independently processing each block of samples comprises a step of compensating impairments of the optical communications system.

13. A method as claimed in claim 12, wherein the impairments comprise any one or more of:
   polarization dependent loss;
   polarization mode dispersion;
   an angle of each polarization of an optical signal received through the optical link.

14. A method as claimed in claim 12, wherein the step of compensating impairments of the optical communications system comprises steps of:
   detecting the predetermined symbol sequence on each transmitted polarization within a SYNC burst;
   computing filter coefficients, based on the detection result, the filter coefficients for enabling de-convolution of transmitted data signals from the sample stream; and
   processing at least a portion of the data symbols using the computed filter coefficients.

15. A method as claimed in claim 14, wherein the steps of detecting the predetermined symbol sequence on each transmitted polarization and computing filter coefficients are repeated for each SYNC burst.

16. A method as claimed in claim 1, wherein the step of independently processing each block of samples comprises a step of detecting a value of data symbols encompassed by the block of samples.

17. A method as claimed in claim 16, wherein the step of detecting the value of data symbols comprises steps of:
   detecting a SYNC burst; and
   determining the carrier phase.

18. A method as claimed in claim 1, wherein the step of independently processing each block of samples comprises a step of routing a block of samples to a respective endpoint which is different from that of at least one other block of samples.

19. A method of controlling a receiver of an optical system, the method comprising steps of:
receiveing an optical signal through the optical communication system, the optical signal comprising SYNC bursts having a predetermined symbol sequence;
over-sampling the received optical signal using a nominal clock to generate a multi-bit digital sample stream having an indeterminate sample phase relative a symbol phase of the optical signal;
processing the multi-bit digital sample stream to detect a characteristic of each SYNC burst; and
training at least one signal processor of the receiver using the detected characteristic, wherein the step of training the at least one signal processor comprises controlling a framer to separate the digital sample stream into blocks of samples, each block of samples at least partially overlapping at least one SYNC burst and a plurality of data symbols, an overlap region of each data block comprising a plurality of samples whic are duplicates of a corresponding plurality of samples in a respective overlap region of at least one other block.

20. A method as claimed in claim 19, wherein the predetermined symbol sequence comprises a respective predetermined symbol sequence on each transmitted polarization of the optical signal.

21. A method as claimed in claim 20, wherein the predetermined symbol sequence on each transmitted polarization comprises a pair of orthogonal bit sequences respectively allocated to In-phase and Quadrature components of the respective transmitted polarization.

22. A method as claimed in claim 20, wherein the optical signal includes two transmitted polarizations, and the predetermined symbol sequences on each transmitted polarization are orthogonal to each other.

23. A method as claimed in claim 19, wherein the predetermined symbol sequence comprises a frequency component that is less than a symbol rate of the optical signal.

24. A method as claimed in claim 23, wherein the frequency component is ½ of the symbol rate, or lower.

25. A method as claimed in claim 19, wherein the step of over-sampling the received optical comprises sampling the optical signal at a sample rate that satisfies the Nyquist criterion for a highest anticipated symbol rate of the optical signal.

26. A method as claimed in claim 19, wherein a repetition rate of the SYNC bursts is at least $10^6$ Hz.

27. A method as claimed in claim 19, wherein a repetition rate of the SYNC bursts is on the order of 1000 times less than a symbol rate of the optical signal.

28. A method as claimed in claim 19, wherein the predetermined symbol sequence is aperiodic.

29. A method as claimed in claim 19, wherein the predetermined symbol sequence is periodic.

30. A method as claimed in claim 19, wherein the predetermined symbol sequence of each successive SYNC burst is the same.

31. A method as claimed in claim 19, wherein the predetermined symbol sequence of one SYNC burst is different from that of at least one other SYNC burst.

32. A method as claimed in claim 19, wherein the detected characteristic of each SYNC burst is an auto-correlation.

33. A method as claimed in claim 32, wherein the step of training at least one signal processor of the receiver comprises a step of calculating coefficients of a polarization compensator using the auto-correlation.

34. A method as claimed in claim 33, wherein the step of calculating coefficients of a polarization compensator is repeated for each SYNC burst of the optical signal.

35. A method as claimed in claim 33, wherein the step of training at least one signal processor of the receiver further comprises a step of loading the calculated coefficients into a polarization compensation filter of a clock recovery circuit.

36. A method as claimed in claim 35, further comprising a step of continuing oversampling of the optical signal using a recovered clock signal generated by the clock recovery circuit in place of the nominal clock, such that the multi-bit sample stream has a known sample timing.

37. A method as claimed in claim 19, wherein the detected characteristic of each SYNC burst is a timing of each SYNC burst.

38. A method as claimed in claim 19, wherein each block of samples comprises a SYNC burst and at least half of the samples lying between the SYNC burst and either one of an immediately preceding and an immediately following SYNC burst.

39. A method as claimed in claim 38, wherein each block of samples comprises a SYNC burst and at least half of the samples respectively lying between the SYNC burst and both of the immediately preceding and immediately following SYNC bursts.

40. A method as claimed in claim 19, wherein the detected characteristic of each SYNC burst is a carrier phase.

41. A method as claimed in claim 40, wherein the step of training at least one signal processor of the receiver comprises a step of controlling an equalizer to detect a probable cycle slip, based on the detected carrier phase.

42. A method as claimed in claim 41, further comprising a step of training the equalizer to correct an effect of each detected probable cycle slip.

43. A method as claimed in claim 40, wherein the step of training at least one signal processor of the receiver comprises a step of using the detected carrier phase of the SYNC burst to enable detection of the carrier phase of each one of a plurality of data symbols adjacent the SYNC burst.

44. A method as claimed in claim 19, wherein the detected characteristic of each SYNC burst is the predetermined symbol sequence.

45. A method as claimed in claim 44, wherein the step of training at least one signal processor of the receiver comprises a step of controlling a decoder to correct an effect of a cycle slip, based on the predetermined symbol sequence.

* * * * *